(12) United States Patent
Lin et al.

(10) Patent No.: US 8,659,581 B2
(45) Date of Patent: Feb. 25, 2014

(54) STYLUS AND PORTABLE ELECTRONIC DEVICE USING SAME

(75) Inventors: You-Zhang Lin, New Taipei (TW); Zhang-Ming Huang, New Taipei (TW); Ming-Chun Hsieh, New Taipei (TW); Yung-Sheng Hsu, New Taipei (TW); Chun-Wei Wu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 185 days.

(21) Appl. No.: 13/284,661

(22) Filed: Oct. 28, 2011

(65) Prior Publication Data

US 2012/0235957 A1 Sep. 20, 2012

(30) Foreign Application Priority Data

Mar. 14, 2011 (TW) .............................. 100108469 A

(51) Int. Cl.
*G06F 3/033* (2013.01)
(52) U.S. Cl.
USPC ........................................ 345/179; 178/19.01
(58) Field of Classification Search
None
See application file for complete search history.

(56) References Cited

U.S. PATENT DOCUMENTS

2011/0281617 A1* 11/2011 Kim et al. .................. 455/556.1
2012/0019464 A1* 1/2012 DiDato ........................ 345/173

* cited by examiner

*Primary Examiner* — Joseph Haley
(74) *Attorney, Agent, or Firm* — Altis Law Group, Inc.

(57) ABSTRACT

A portable electronic device, including a housing defining an earphone connector, a touch screen, and a stylus having a stylus body, a tip and a pin connecting the stylus body with tip, and the pin and the tip are detachably secured in the earphone connector.

12 Claims, 3 Drawing Sheets

STYLUS AND PORTABLE ELECTRONIC DEVICE USING SAME

BACKGROUND

1. Technical Field

The disclosure generally relates to styluses, and particularly to a stylus used in portable electronic device.

2. Description of the Related Art

Portable electronic device may include a display module and a touch screen above the display module. Portable electronic device may further provide a stylus used to tap the display module for inputting commands to the device. Typically, the portable electronic device defines a stylus jack for receiving the stylus, and may further define an earphone connector to electronically connect to an earphone. Accordingly, the stylus jack and the earphone connector take up valuable space on the device.

Therefore, there is room for improvement within the art.

BRIEF DESCRIPTION OF THE DRAWINGS

Many aspects of the exemplary stylus and the portable electronic device can be better understood with reference to the following drawings. The components in the various drawings are not necessarily drawn to scale, the emphasis instead being placed upon clearly illustrating the principles of the exemplary stylus and portable electronic device. Moreover, in the drawings, like reference numerals designate corresponding parts throughout the diagrams.

DETAILED DESCRIPTION

Figure 3:
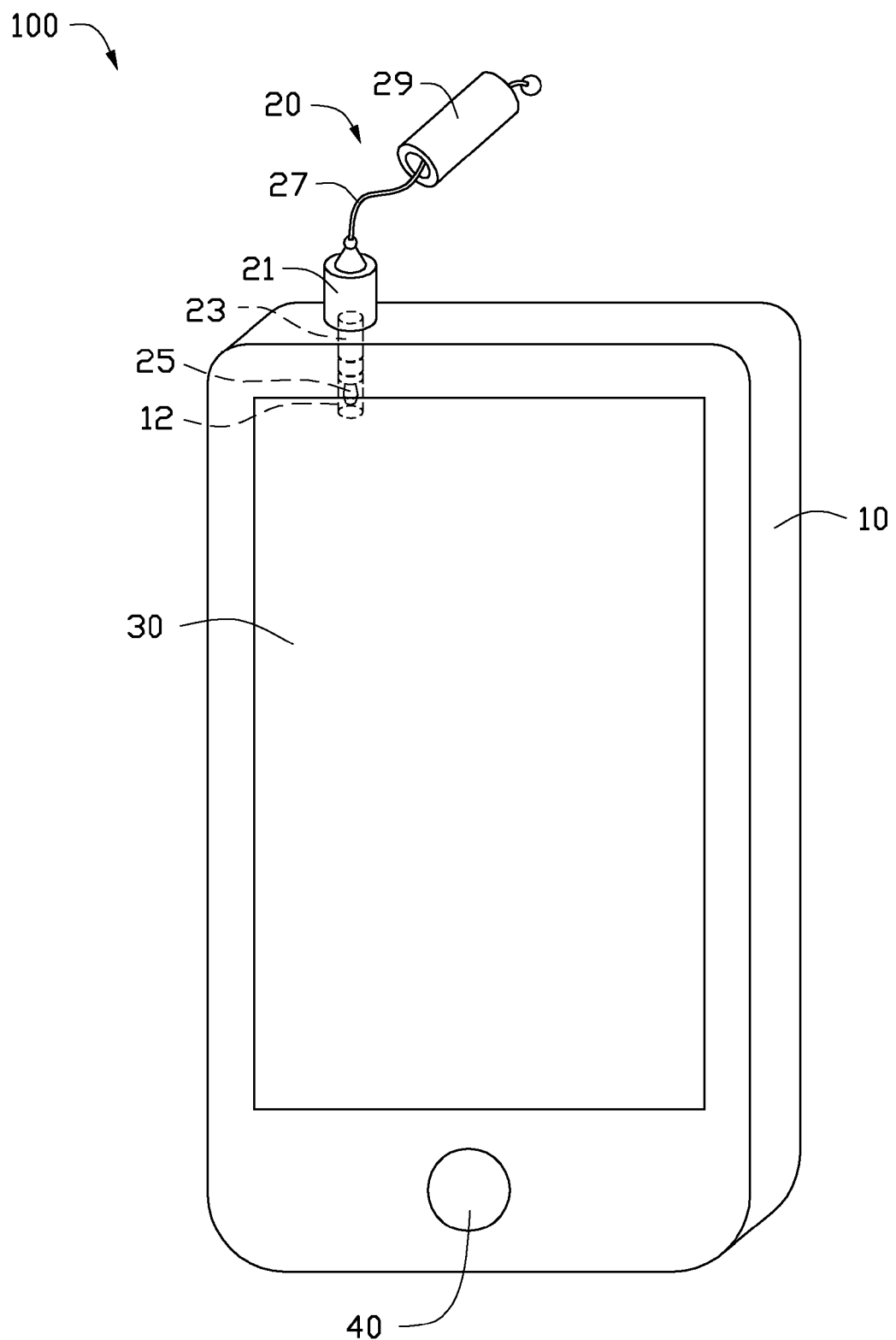
FIG. 3 is an isometric view of an exemplary electronic device employing the stylus shown in FIG. 1.

Referring to FIG. 3, an exemplary portable electronic device 100 (e.g., mobile phone) includes a housing 10, a stylus 20, a touch screen 30 and keys 40. The housing 10 defines an earphone connector 12 therein.

Figure 1:
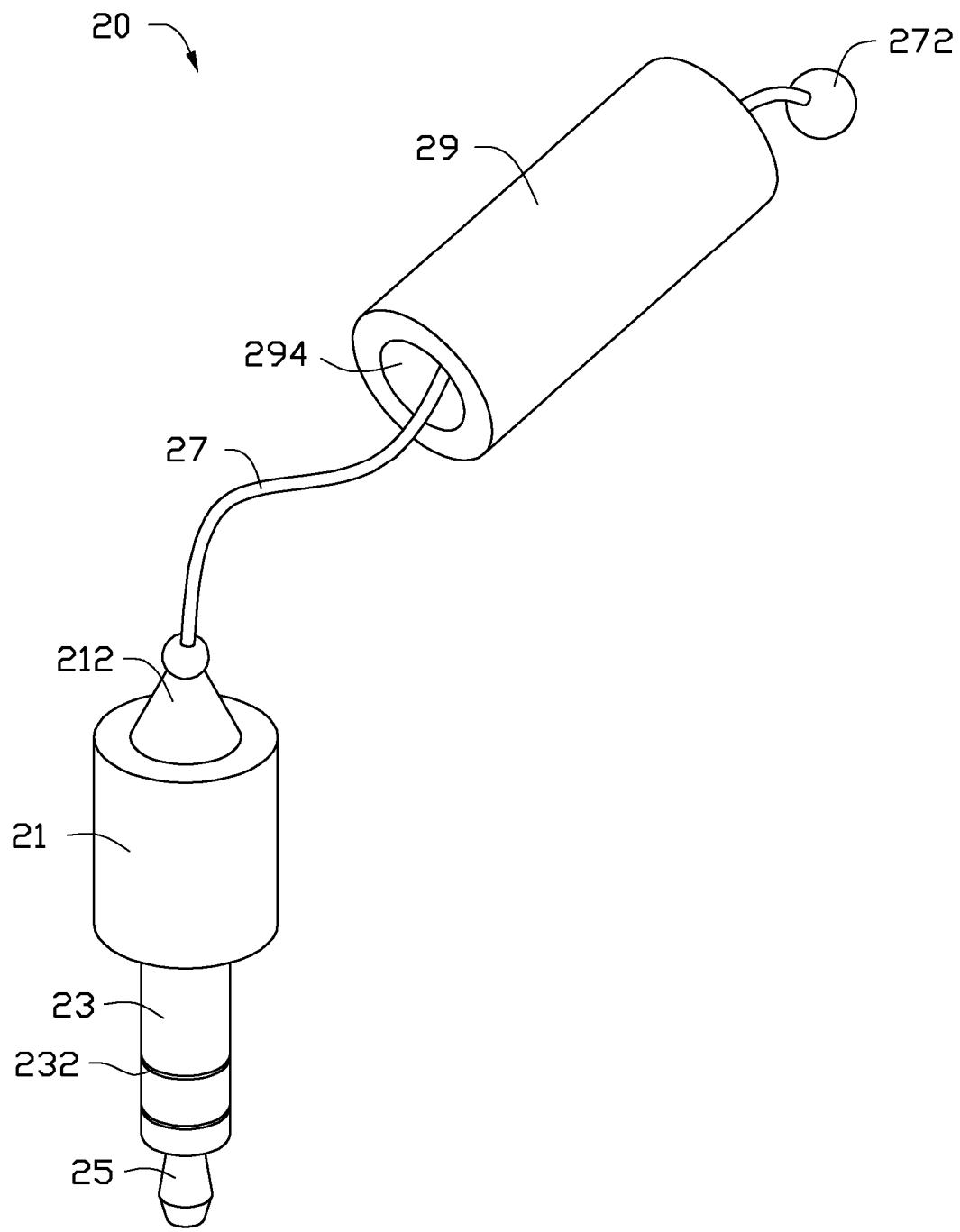
FIG. 1 is an isometric view of an exemplary stylus, when the stylus is in a standby state.
Figure 2:
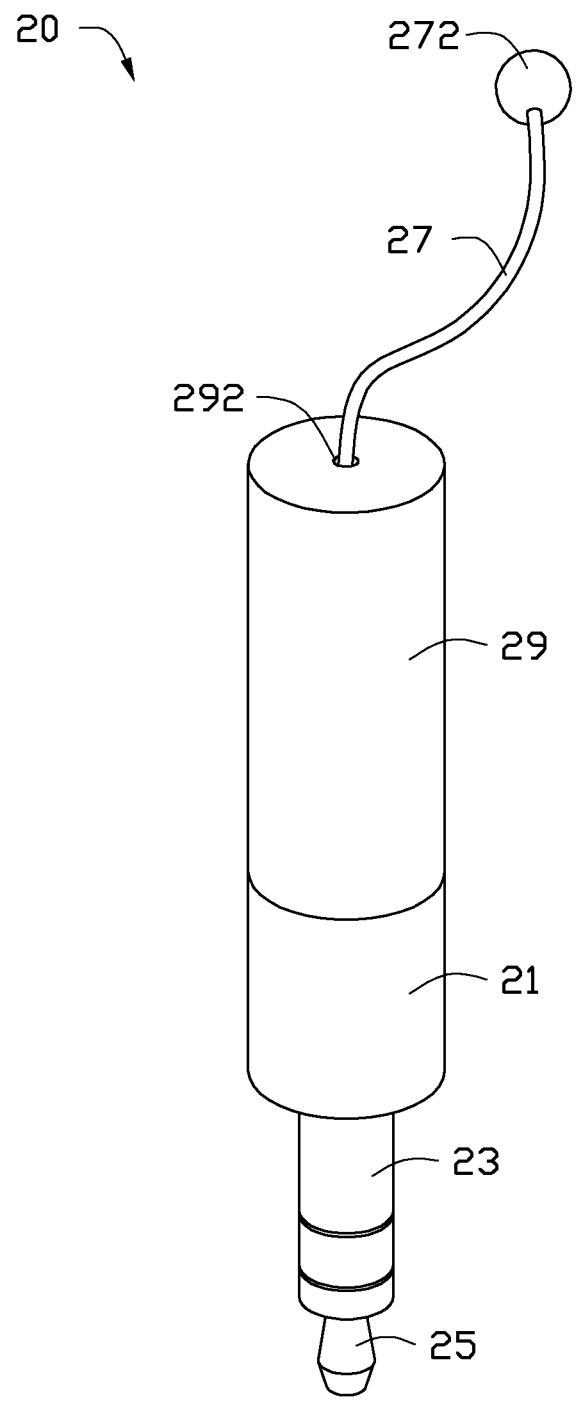
FIG. 2 is similar to FIG. 1, but the stylus is in a using state.

FIGS. 1 and 2 show an exemplary stylus 20 including a stylus body 21, a pin 23, a tip 25, a rope 27, and an ornamental member 29. The stylus body 21 and the tip 25 are formed on opposite ends of the pin 23. The rope 27 is used to hang the ornamental member 29 on the stylus body 21. If the touch screen 30 is capacitive, the stylus body 21, the pin 23, the ornamental member 29, and the tip 25 can be made of conductive materials, to form a circuit loop as the stylus 20 is contacting the touch screen 30. Specifically, the stylus body 21, the pin 23, and the ornamental member 29 are preferred to be made of metal or conductive rubber so as to provide comfort when holding the stylus 20, and the tip 25 is preferred to be made of soft conductive rubber so as to avoid damaging or scratching the touch screen 30.

The stylus body 21 has a locking portion 212. The locking portion 212 projects from a distal end of the stylus body 21, opposite to the pin 23. The locking portion 212 is conical shaped, and has a bigger end formed on the distal end of the stylus body 21, and a smaller end connecting to one end of the rope 27. The pin 23 has two locking slots 232 defined in a peripheral wall thereof. The stylus body 21, the pin 23, and the tip 25 cooperatively form a plug which has a shape and size of a standard earphone plug, such as a standard 3.5 mm earphone plug. Therefore, the pin 23 and the tip 25 can be plugged into and fitted right in the earphone connector 12 to attach the stylus 20 to the housing 10. The stylus body 21 has a larger size than that of the earphone connector 12, so the stylus body 21 covers earphone connector 12 to protect the earphone connector 12 from dust and/or moisture damages. The other end of the rope 27 has a limiting member 272 for preventing the ornamental member 29 from departing from the rope 27. The ornamental member 29 is slidably mounted on the rope 27 between the stylus body 21 and limiting member 272. The ornamental member 29 defines a through connector 292 and a locking connector 294 communicating with the through connector 292. The rope 27 is mounted in the through connector 292, and the locking portion 212 of the stylus body 21 is detachably engaged within the locking connector 294.

Referring to FIG. 2, when the stylus 20 is used to touch the touching screen 30, i.e., the stylus 20 is in a use state, the ornamental member 29 is moved towards the stylus body 21 along the rope 27 until the locking portion 212 of the stylus body 21 engages in the locking connector 294 of the ornamental member 29. Thus, the stylus 20 has an elongated length so the user can conveniently hold the stylus 20 in use.

Referring to FIG. 3, to attach the stylus 20 to the housing 10, the pin 23 and the tip 25 are inserted and secured into the earphone connector 12. Therefore, the earphone connector 12 can be sealed by the pin 23 and thus blocking entry of the water or dust. Furthermore, the tip 25 formed on the pin 23 can be protected in the earphone connector 12. The ornamental member 29 can detach from the stylus body 21 while still connected to the stylus body 21 with the rope 27.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stylus for electronic device, comprising:
   a stylus body;
   a rope fixed to the stylus body;
   an ornamental member slidably mounted on the rope, and detachably fixed to the stylus body;
   a tip for tapping a touch screen; and
   a pin connecting the tip with the stylus body, the pin and the tip detachably secured in an earphone connector of the electronic device;
   wherein the ornamental member defines a through connector, and the rope is mounted in the through connector, a distal end of the stylus body projects a locking portion, the ornamental member defines a locking connector communicating with the through connector, and the locking portion is detachably engaged within the locking connector.

2. The stylus as claimed in claim 1, wherein the stylus body, the pin and the tip cooperatively form a plug which has a shape and size of a standard earphone plug.

3. The stylus as claimed in claim 1, wherein the stylus body, the pin, the ornamental member and the tip are made of conductive material.

4. The stylus as claimed in claim 3, wherein the pin is made of metal.

5. The stylus as claimed in claim 4, wherein the stylus body and the ornamental member are made of conductive rubber.

6. The stylus as claimed in claim 3, wherein the tip is made of soft conductive rubber.

7. A portable electronic device, comprising:
a housing defines an earphone connector;
a touch screen;
a stylus comprising:
- a stylus body;
- a rope fixed to the stylus body;
- an ornamental member slidably mounted on the rope, and detachably fixed to the stylus body;
- a tip for tapping the touch screen; and
- a pin connecting the stylus body with tip, the pin and the tip detachably secured in the earphone connector;
- wherein the ornamental member defines a through connector, and the rope is mounted in the connector, a distal end of the stylus body projects a locking portion, the ornamental member defines a locking connector communicating with the through connector and the locking portion is detachably engaged within the locking connector.

8. The stylus as claimed in claim 7, wherein the stylus body, the pin and the tip cooperatively form a plug which has a shape and size of a standard earphone plug.

9. The stylus as claimed in claim 7, wherein the stylus body, the pin, the ornamental member and the tip are made of conductive material.

10. The stylus as claimed in claim 9, wherein the pin is made of metal.

11. The stylus as claimed in claim 10, wherein the stylus body and the ornamental member are made of conductive rubber.

12. The stylus as claimed in claim 9, wherein the tip is made of soft conductive rubber.

\* \* \* \* \*